US005768773A

United States Patent [19]
Fredell et al.

[11] Patent Number: 5,768,773
[45] Date of Patent: Jun. 23, 1998

[54] FIXTURE AND METHOD FOR REPOSITIONING COMPONENTS ON A CIRCUIT BOARD

[75] Inventors: James Edmund Fredell, Brockport; Brian Norman Zimmer, Rochester, both of N.Y.

[73] Assignee: Eastman Kodak Company, Rochester, N.Y.

[21] Appl. No.: 572,361

[22] Filed: Dec. 14, 1995

[51] Int. Cl.[6] ..................................................... H05K 3/34
[52] U.S. Cl. .............................. 29/832; 29/760; 29/739; 29/404; 140/147; 269/309
[58] Field of Search .......................... 29/832, 834, 835, 29/836, 593, 760, 739, 741, 404, 407.09, 464, 281.1; 269/309, 40, 47; 140/147

[56] References Cited

U.S. PATENT DOCUMENTS

| | | | |
|---|---|---|---|
| 5,021,811 | 6/1991 | Maurinus et al. | 354/76 |
| 5,101,550 | 4/1992 | Dunaway et al. | 29/760 |
| 5,446,960 | 9/1995 | Isaacs et al. | 29/834 |

FOREIGN PATENT DOCUMENTS

| | | | |
|---|---|---|---|
| 0 658 799 A1 | 12/1994 | European Pat. Off. | G03B 19/04 |
| 7-114069 | 2/1995 | Japan | G03B 15/05 |

*Primary Examiner*—Carl E. Hall
*Assistant Examiner*—Christopher Goins
*Attorney, Agent, or Firm*—Gordon M. Stewart; Charles E. Snee, III

[57] ABSTRACT

A fixture (90) is disclosed for repositioning at least one mispositioned component (28, 78) mounted via at least one deformable connector (74,76) on and extended outward from a circuit board (20). The fixture includes a base (92); means (94–116, 126–134) supported by the base for simulating a mounting geometry for the circuit board in an apparatus (10) into which the circuit board is to be installed; and camming means (118–124) supported by the base for engaging the component to deform the connector and thereby reposition the component to a desired position for installation in the apparatus. When the circuit board is placed on the means for simulating, the component engages the camming means to deform the connector and reposition the component to the desired position. A corresponding method is disclosed.

11 Claims, 8 Drawing Sheets

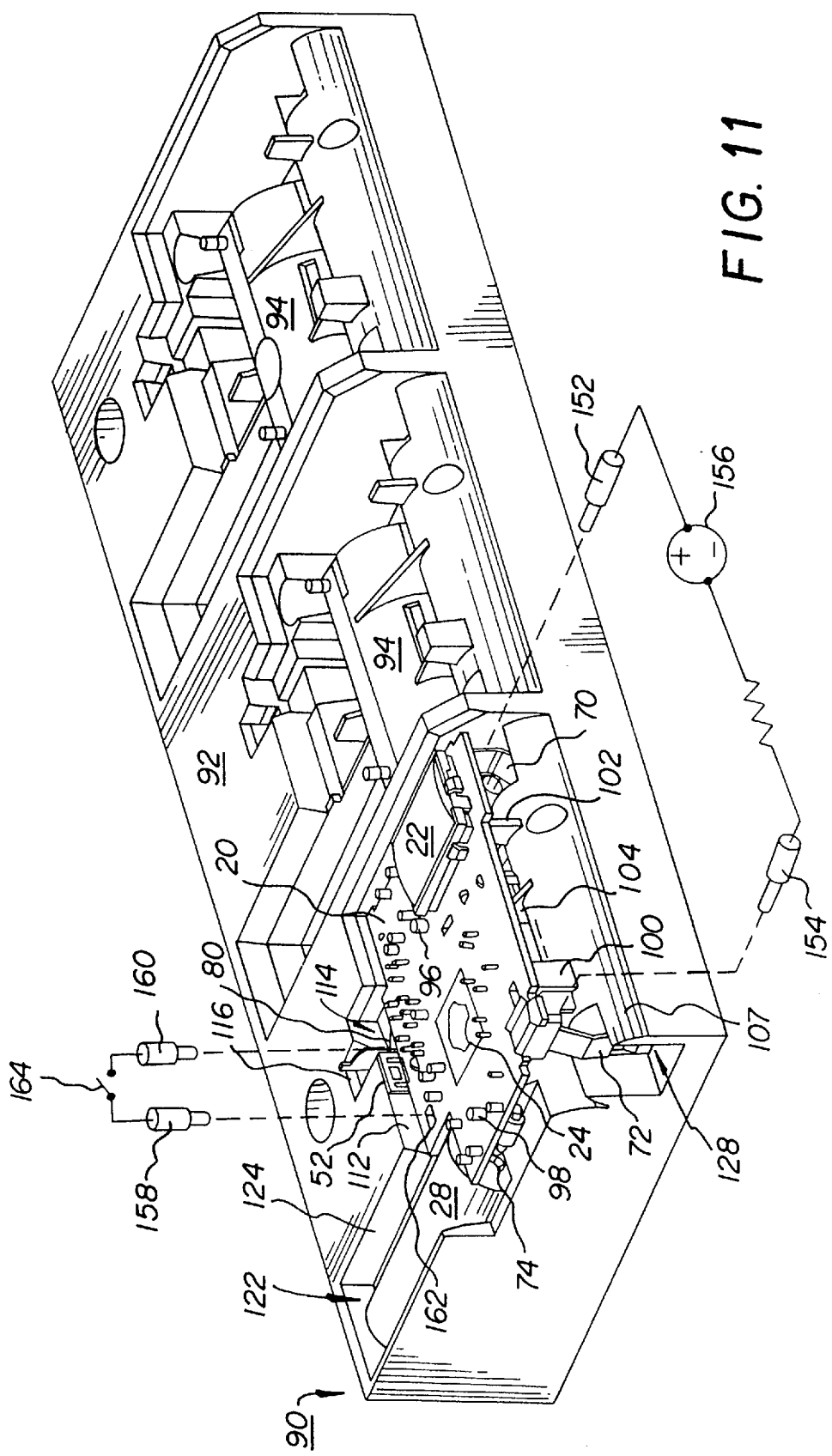

FIXTURE AND METHOD FOR REPOSITIONING COMPONENTS ON A CIRCUIT BOARD

TECHNICAL FIELD

The invention concerns apparatus and methods for geometrically checking and adjusting the geometry and for testing the electrical characteristics of circuit boards. More particularly, the invention is related to such apparatus and methods for use with flash printed circuit boards for photographic cameras.

BACKGROUND OF THE INVENTION

In recent years, so-called single use or disposable cameras have become popular, such as those disclosed in commonly assigned U.S. Pat. Nos. 4,890,130 and 5,235,366. Components of one such camera are shown in FIGS. 1 to 3. As shown in FIG. 1, such a camera may include an internal frame 10 which typically has been molded from a suitable plastic material. Mounted to the frame are various internal camera components such as a thumbwheel 12, a taking lens and shutter assembly 14, a viewfinder 16, and a counterwheel 18, all of whose functions are familiar to those skilled in the camera technologies. Popular versions of such cameras also include a flash printed circuit board 20 mounted to frame 10. A flash unit 22, flash activation switch 24, battery 26, and flash capacitor 28 are mounted to circuit board 20. One such flash printed circuit board is disclosed in commonly assigned U.S. application Ser. No. 08/330,658 filed 28 Oct. 1994 by Clay A. Dunsmore. In an assembled camera, the structure of FIG. 1 would be enclosed in a light-tight outer housing having suitable openings for the thumbwheel, taking lens, shutter trigger, flash activation switch, and the like.

As shown in FIG. 2, internal frame 10 may include a semicylindrical film shell 30 which, in use of an assembled camera, partially encloses a scroll of unexposed film. Extended outwardly from opposite ends of shell 30 are a pair of positioning pins 32, 34 which are received in correspondingly placed apertures in circuit board 20. Next to shell 30 is a semicylindrical battery shell 36 which partially encloses battery 26 in the assembled camera. A flexible latch finger 38 extends upwardly from shell 36 in position to cooperate with an aperture in the circuit board. A U-shaped support wall 39 surrounds finger 38 and engages the back side of the circuit board. A support post 40 also extends from shell 36 to engage the back side of the circuit board. A pair of spaced stiffener ribs 42, 44 extend between one side of shell 30 and shell 36; and a further pair of spaced stiffener ribs 46, 48 extend between an opposite side of shell 30 and the remainder of internal frame 10. A catch 50 is provided on the frame to engage with an aperture in a transversely extended flange 52 on the circuit board. To support capacitor 28, internal frame 10 also includes a pair of spaced cradle ribs 54, 56 whose curved upper surfaces 58, 60 engage the cylindrical surface of the capacitor.

As best seen in FIG. 3, the circuit board also supports a pair of flexible conductive clips 70, 72 for electrically connecting battery 26 to the remaining electrical components of the circuit board. Also visible in FIG. 3 are a pair of deformable connectors 74, 76 which are bent at about a right angle between the capacitor and the circuit board to both electrically connect and physically support the capacitor. As shown, the capacitor is mounted on and extends outwardly from the circuit board. Supported on the back side of the circuit board is a flash-ready light bulb 78 which, in the familiar manner, will be illuminated when capacitor 28 is charged sufficiently to operate flash unit 22. Bulb 78 typically is positioned a short distance from the circuit board on a pair of deformable conductors, not illustrated. A laterally extending flange 80 is provided for mechanical connection to the shutter return spring and also is part of the flash triggering circuit. Next to bulb 78 is located a transformer 82 which forms part of the flash circuit. Next to flexible clip 72 is positioned a transformer 84. Between capacitor 28 and bulb 78 are located a trio of transistors 86, a capacitor 88 and a capacitor 89. Like capacitor 28 and bulb 78, circuit elements 82–89 extend outwardly a significant distance from circuit board 20.

Some known assembly processes for such cameras call for assembly of the circuit board and other components to the internal frame, followed by various tests to confirm mechanical and electrical operability. Should there be a problem, the partially assembled camera may then have to be disassembled for repair or replacement of defective components, which can be quite expensive and time consuming. Concerning the circuit board itself, problems can arise because certain components of the board have become mispositioned on the circuit board prior to the time of assembly into a camera. Such mispositioning may occur because the connectors to the circuit board have become bent out of their optimum position. In addition, the size of various components may vary enough to create interferences with camera frame 10 or with other components within a closely packed camera. Thus, a mispositioned or oversized capacitor may interfere with other camera components during final assembly; or the bulb may not be positioned to be visible through a light pipe provided in the viewfinder. Or, the electrical performance of the circuit board may have become impaired due to mishandling following initial testing after circuit board assembly.

The prior art reveals some attempts to deal with such problems. Laid open Japanese Patent Application No. 7/114069, published on 5 Feb. 1995, shows a system for modifying the positions of components of a flash printed circuit board prior to assembly into a camera. Complex mechanical linkages or manual adjustment are used to reposition the components. Laid open European Patent Application No. 0 658 799 A1, published 21 Jun. 1995, shows a system for inspecting such circuit boards. Complex optical sensors are used to detect mispositioned components and flawed circuit boards are removed for off-line repair.

So, a need has existed for a simpler apparatus and method for conveniently checking and correcting the mechanical configuration and for checking the electrical performance of a flash printed circuit board, before installation of the circuit board on internal frame 10.

SUMMARY OF THE INVENTION

The primary objective of the invention is to provide an improved fixture and method for checking and correcting the mechanical configuration of components of a flash printed circuit board, prior to assembly of the circuit board into a camera.

A further objective of the invention is to provide such a fixture which can also be used to hold the circuit board during electrical testing.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A fixture in accordance with the invention is particularly suited for repositioning at least one mispositioned component mounted via at least one deformable connector on and extended outward from a circuit board. As such, the fixture may include a base; means supported by the base for simulating a mounting geometry for the circuit board in an apparatus into which the circuit board is to be installed; and camming means supported by the base for engaging the component to deform the connector and thereby reposition the component to a desired position for installation in the apparatus. As a result of this structure, when the circuit board is placed on the means for simulating, the component engages the camming means to deform the connector and reposition the component to the desired position.

The camming means preferably is stationary on the base. The camming means may include a recess in the base for receiving the component as the circuit board is placed on the means for simulating, the recess having an inlet tapered inwardly to the recess for engaging the component to deform the connector and reposition the component into the desired position within the recess. When the circuit board is a flash printed circuit board for a photographic camera, the component may be a flash charging capacitor and the recess may be configured to receive the capacitor. The component also may be a flash ready light bulb and the recess may be configured to receive the bulb. Recesses of this type may be provided for as many components as may require repositioning.

The method of the invention is useful for repositioning at least one mispositioned component mounted via at least one deformable connector on and extended outward from a circuit board. Thus, the method may include steps of (a) providing a fixture including a base; means supported by the base for simulating a mounting geometry for the circuit board in an apparatus into which the circuit board is to be installed; and camming means supported by the base for engaging the component to deform the connector and thereby reposition the component to a desired position for installation in the apparatus; (b) supporting the circuit board on the means for simulating; and (c) pressing the component into engagement with the camming means to engage the component to deform the connector and reposition the component to the desired position.

The invention provides various advantages. Circuit boards having mispositioned or improperly sized components can be quickly and simply checked. Mispositioned components are automatically repositioned when engaged with the fixture. The same fixture used to check mechanical conformance of the circuit board then can be used to check electrical operability.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 11 shows a perspective view of the fixture of FIG. 4, with the printed circuit board of FIG. 3 inserted in the fixture.

DESCRIPTION OF THE PREFERRED EMBODIMENTS

Figure 1:
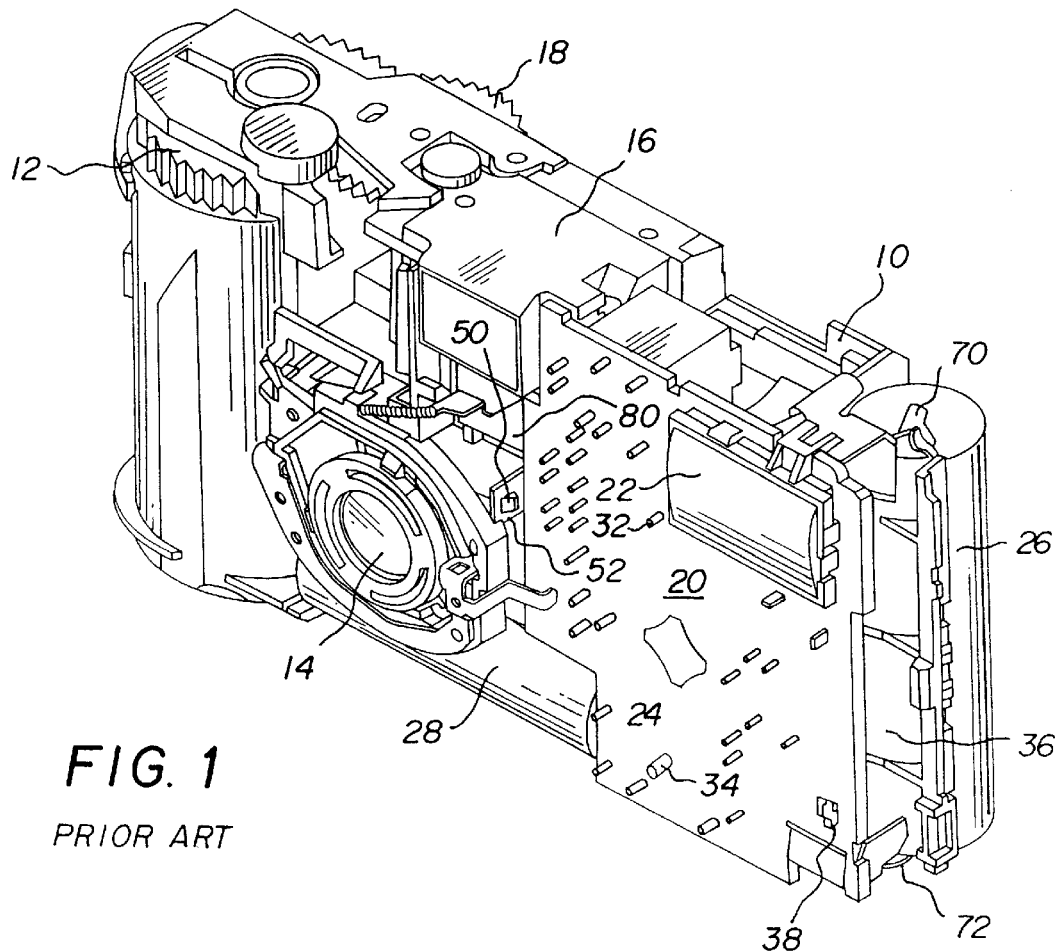
FIG. 1 shows a perspective view of a prior art internal camera frame on which various camera components have been mounted.
Figure 2:
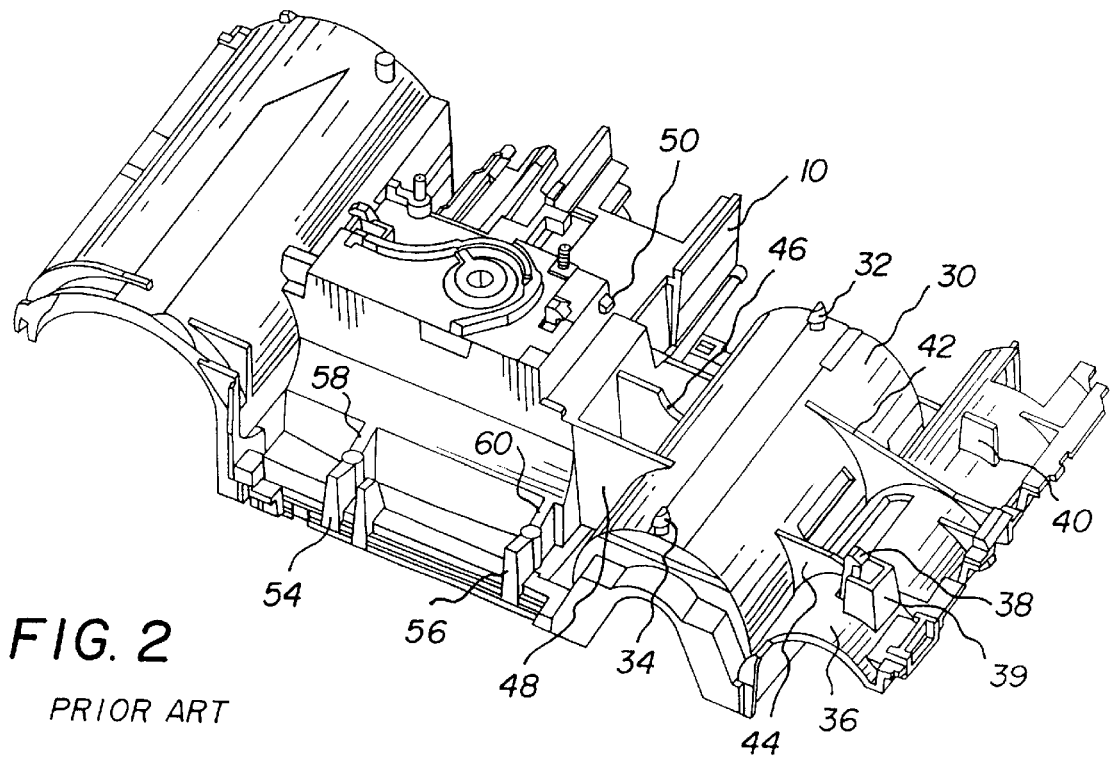
FIG. 2 shows a perspective view of the prior art internal camera frame of FIG. 1, on which other camera components have yet to be mounted.

The following is a detailed description of the preferred embodiments of the invention, reference being made to the drawings in which the same reference numerals identify the same elements of structure in each of the several Figures.

Referring to FIGS. 4 to 9, a fixture 90 according to the invention can be understood. The fixture includes a base block 92 which may be made from any convenient material such as plastic or metal. In the illustrated embodiment, fixture 90 is configured to receive three flash printed circuit boards; however, those skilled in the art will appreciate that the fixture readily,could be configured to receive fewer or more circuit boards. The features of the fixture provided on base block 92 are configured to simulate the mounting geometry for the circuit board on an apparatus, such as camera frame 10, on or into which the circuit board is to be installed. Thus, a semicylindrical portion 94 is provided, to simulate the outer geometry of film shell 30. A pair of positioning pins 96, 98 simulate pins 32, 34. A pair of support posts 100, 102 simulate support wall 39 and support post 40. A pair of ribs 104, 106, simulating ribs 42, 44, extend from portion 94 to a semicylindrical portion 107 which simulates battery shell 36. A pair of ribs 108, 110 simulate ribs 46, 48. An upwardly extended surface 112 simulates the support surface for catch 50. A stepped recess 114 is provided in the base block to receive lateral flange 80. On the edges of recess 114, a slight lead-in chamfer or taper 116 is provided to guide flange 80 into place.

Camming means are provided for engaging a mispositioned component to deform its connectors and thereby reposition the component to a position desired for installation in an associated apparatus such as camera frame 10. As used in this description, "camming" implies that the means for engaging functions simply by sliding contact with a mispositioned component as the circuit board is moved into engagement with fixture 90. Thus, a component can be repositioned on the circuit board without requiring any actuator or linkage external to the fixture to operate the means for engaging. A recess 118 is provided to receive flash-ready light bulb 78. Preferably, recess 118 extends completely through base block 92, to allow light from the bulb to pass to a sensor, as will be discussed subsequently. At the upper end of recess 118, a lead-in chamfer or tapered inlet 120 is provided to engage a mispositioned bulb when a circuit board is pressed into engagement with the fixture, thereby acting as a cam to cause the connectors of the bulb to deform and reposition the bulb to the desired position for installation into camera frame 10. Of course, a properly positioned bulb will simply move into recess 118 without engaging tapered inlet 120. In a similar manner, a half-cylindrical recess 122, simulating cradle ribs 54, 56, is provided to receive capacitor 28. At the upper end of recess 122, a lead-in chamfer or tapered inlet 124 is provided around the recess to engage a mispositioned capacitor when a circuit board is pressed into engagement with the fixture. As a result of camming engagement with tapered inlet 124, connectors 74, 76 are deformed to reposition the capacitor to the desired position for installation into the camera frame. Again, a properly positioned capacitor will simply move into recess 122 without engaging tapered inlet 124. The angles of tapered inlets 120 and 124 are chosen to accommodate the greatest anticipated mispositioning of the components, with an angle in the range of 5 to 10 degrees being sufficient for typical circuit board components. Tapered inlets 120 and 124 preferably are stationary on base 92; however, those skilled in the art will appreciate that the camming surfaces could be resiliently mounted without departing from the scope of our invention.

Figure 3:
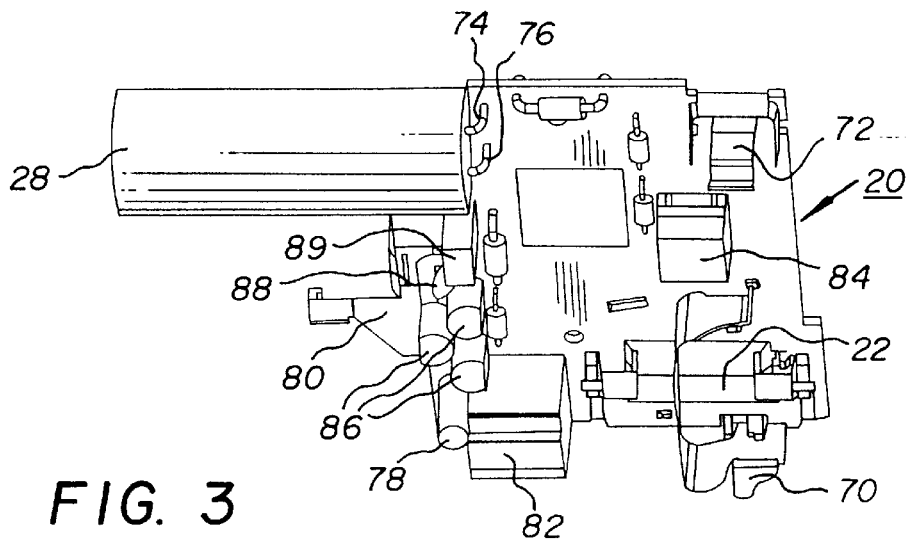
FIG. 3 shows a perspective view of a back side of a prior art flash printed circuit board, of the type mounted to the camera frame of FIG. 1.
Figure 5:
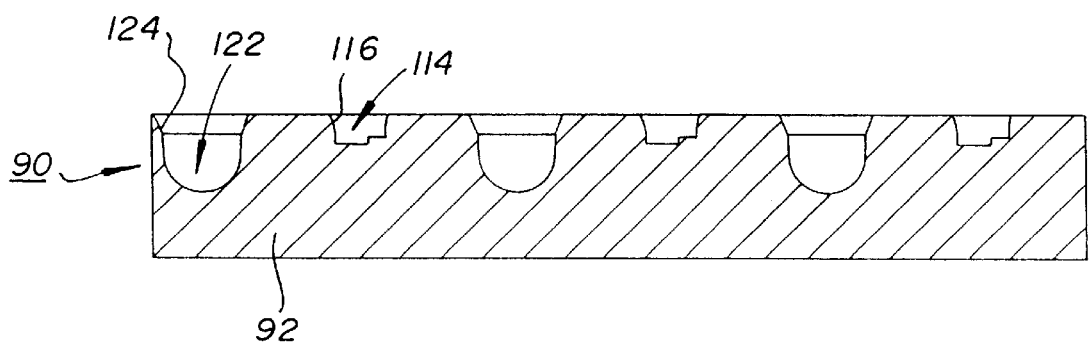
FIG. 5 shows a section view taken along line 5—5 of FIG. 4.
Figure 6:
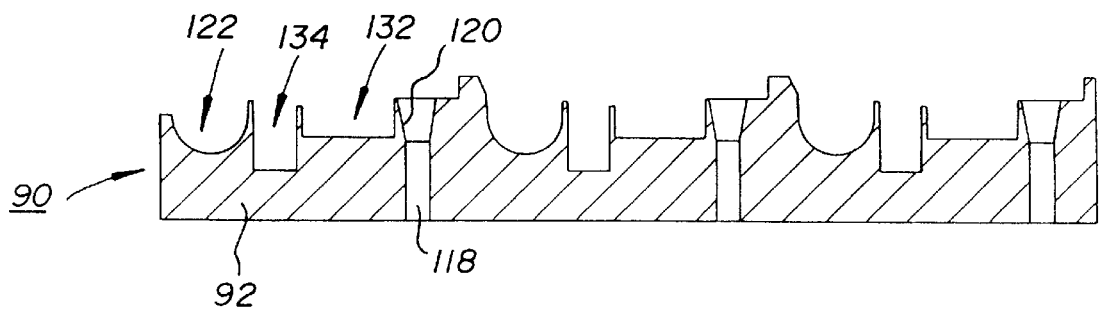
FIG. 6 shows a section view taken along line 6—6 of FIG. 4.
Figure 4:
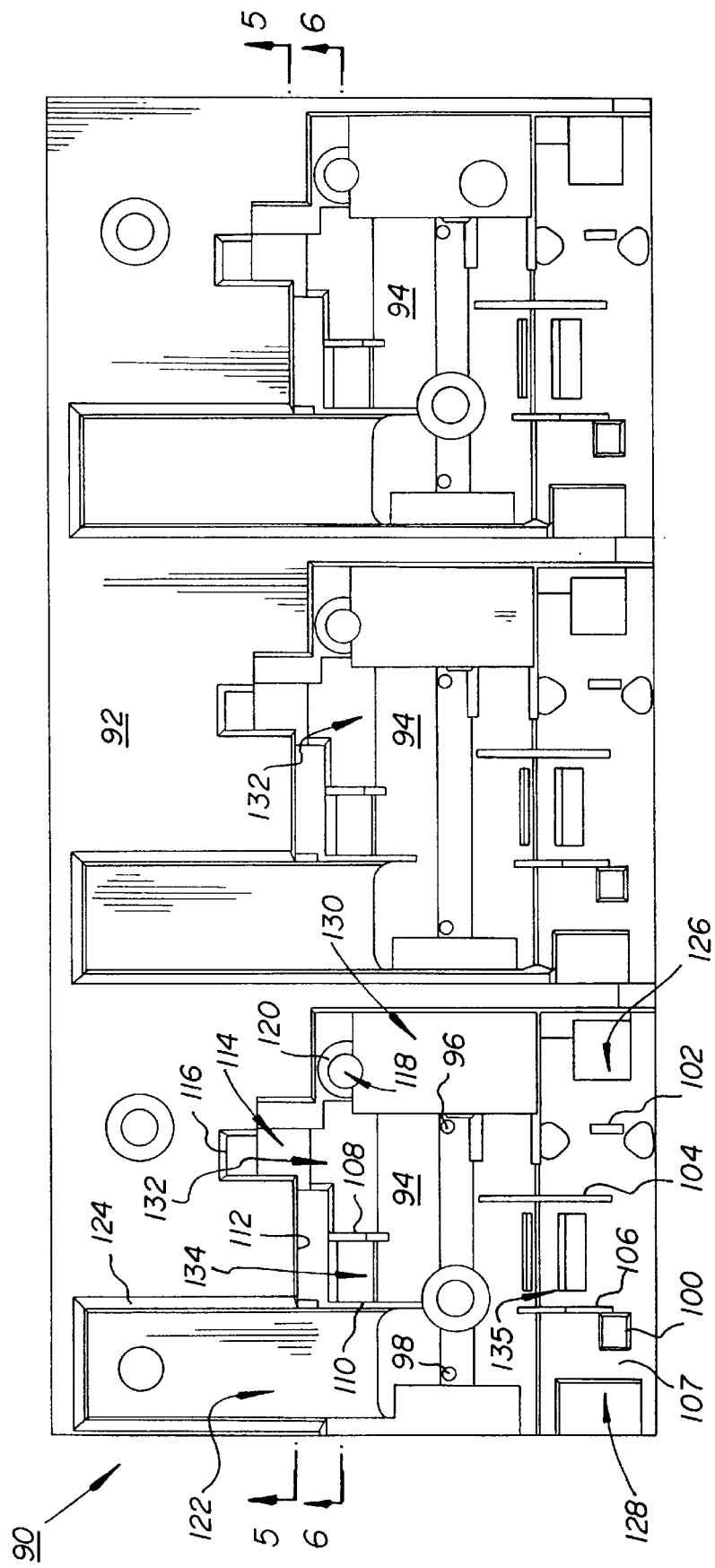
FIG. 4 shows a plan view of a fixture according to the invention.
Figure 7:
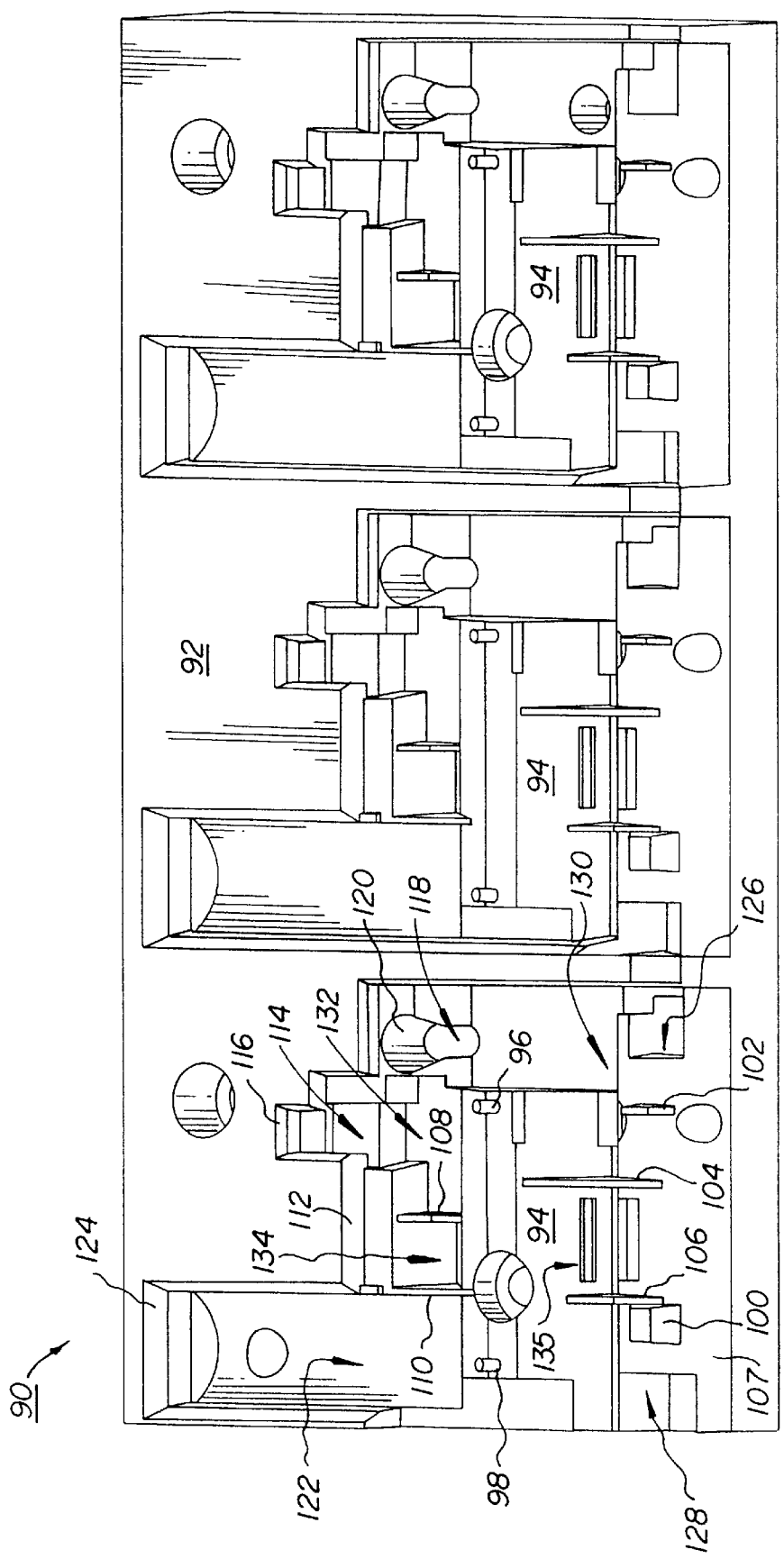
FIG. 7 shows a front perspective view of the fixture of FIG. 4.
Figure 8:
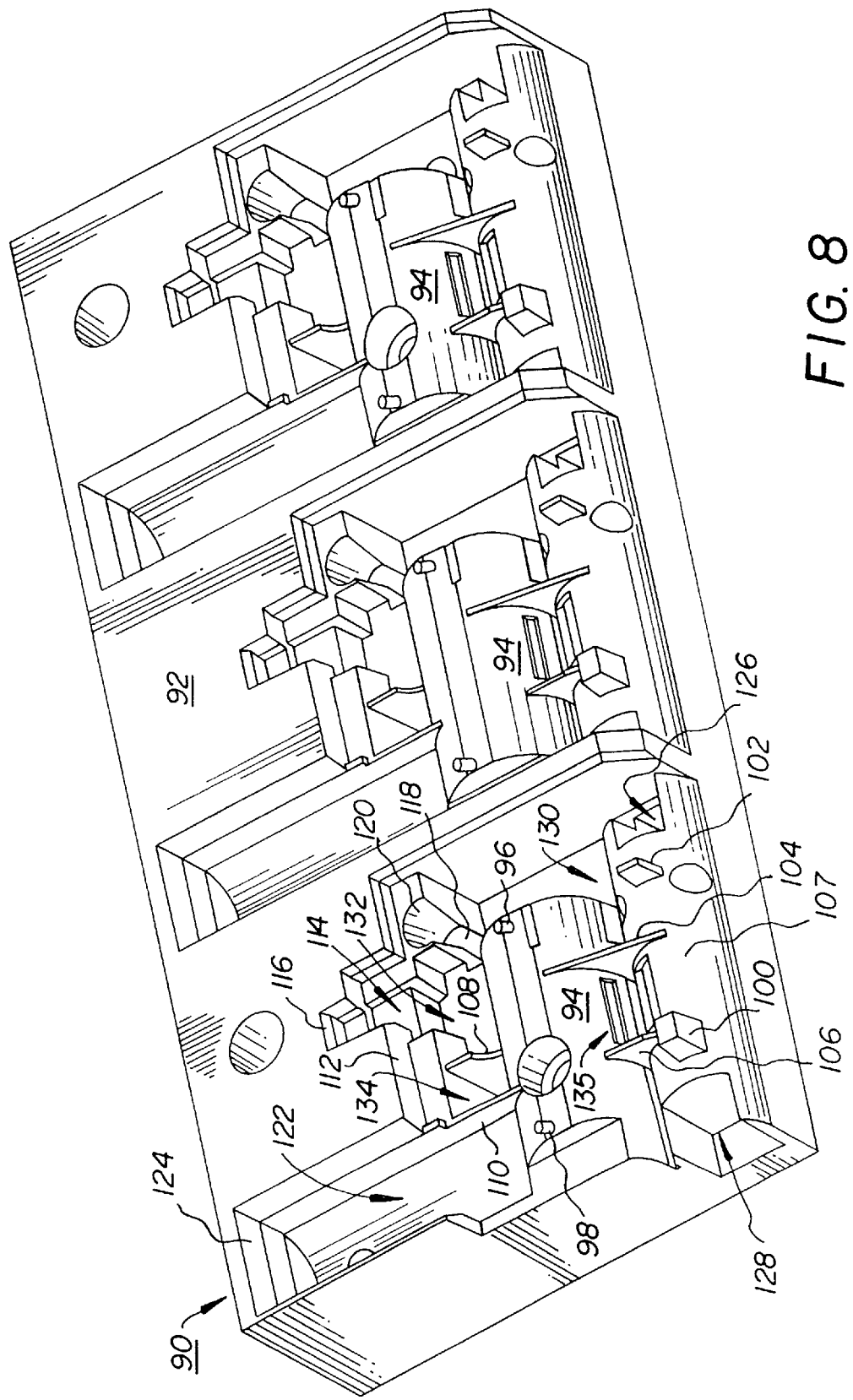
FIG. 8 shows a left side perspective view of the fixture of FIG. 4.
Figure 9:
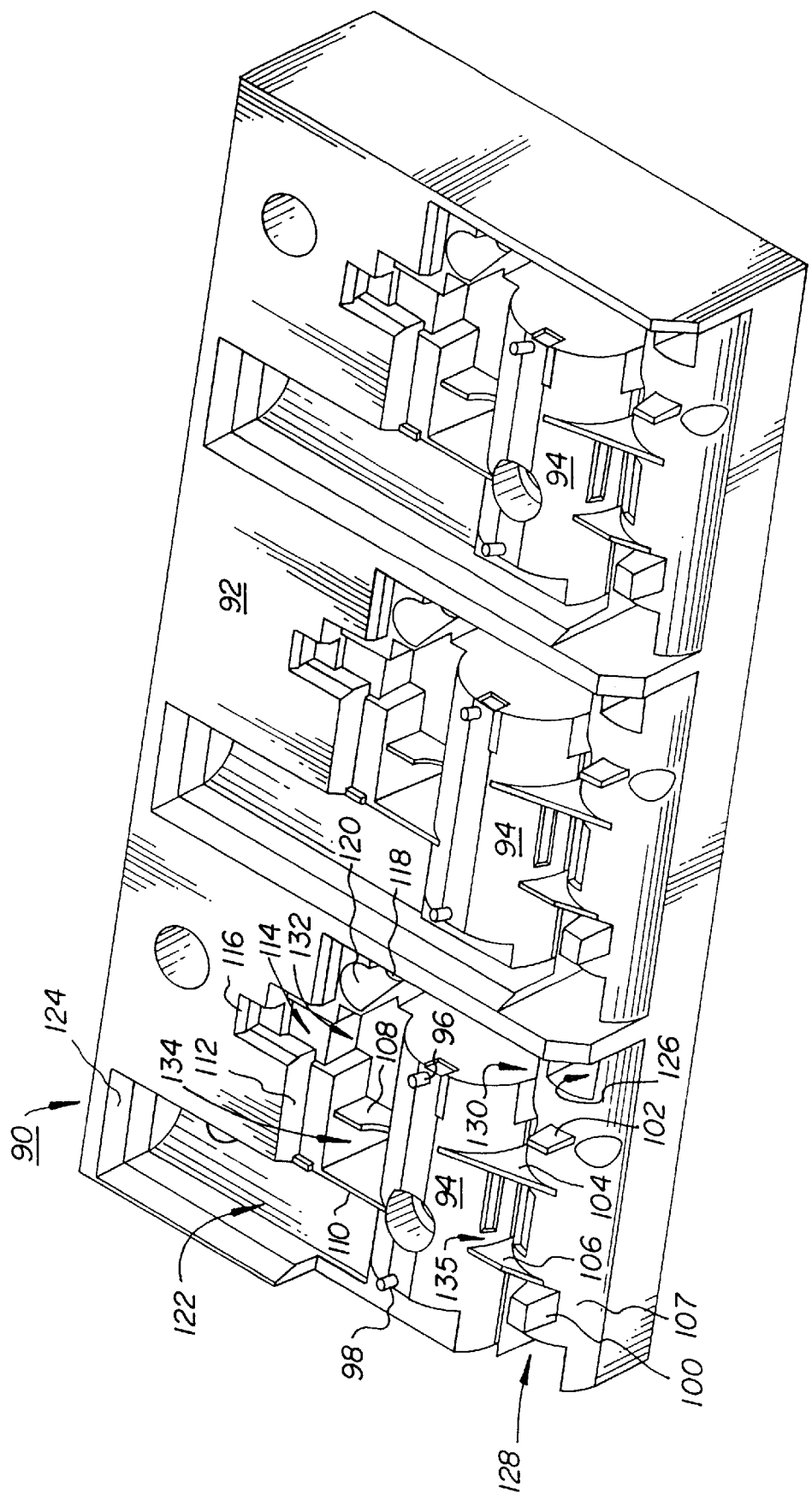
FIG. 9 shows a right side perspective view of the fixture of FIG. 4.

At the opposite ends of semicylindrical portion 107, recesses 126, 128 are provided to receive battery clips 70, 72. In front of recess 118, a recess 130 is provided to receive flash unit 22 and transformer 82. In front of recess 114, a recess 132 is provided to receive transistors 86 and capacitor 88. Between ribs 108, 110 is provided a recess 134 to receive capacitor 89. Between ribs 104, 106 is provided a recess 135 to receive transformer 84. Although the fixture of FIGS. 4 to 9 is configured to receive the circuit board of FIG. 3, those skilled in the art will appreciate that a fixture in accordance with the invention may be configured to receive a great variety of circuit boards having components needing repositioning.

Figure 10:
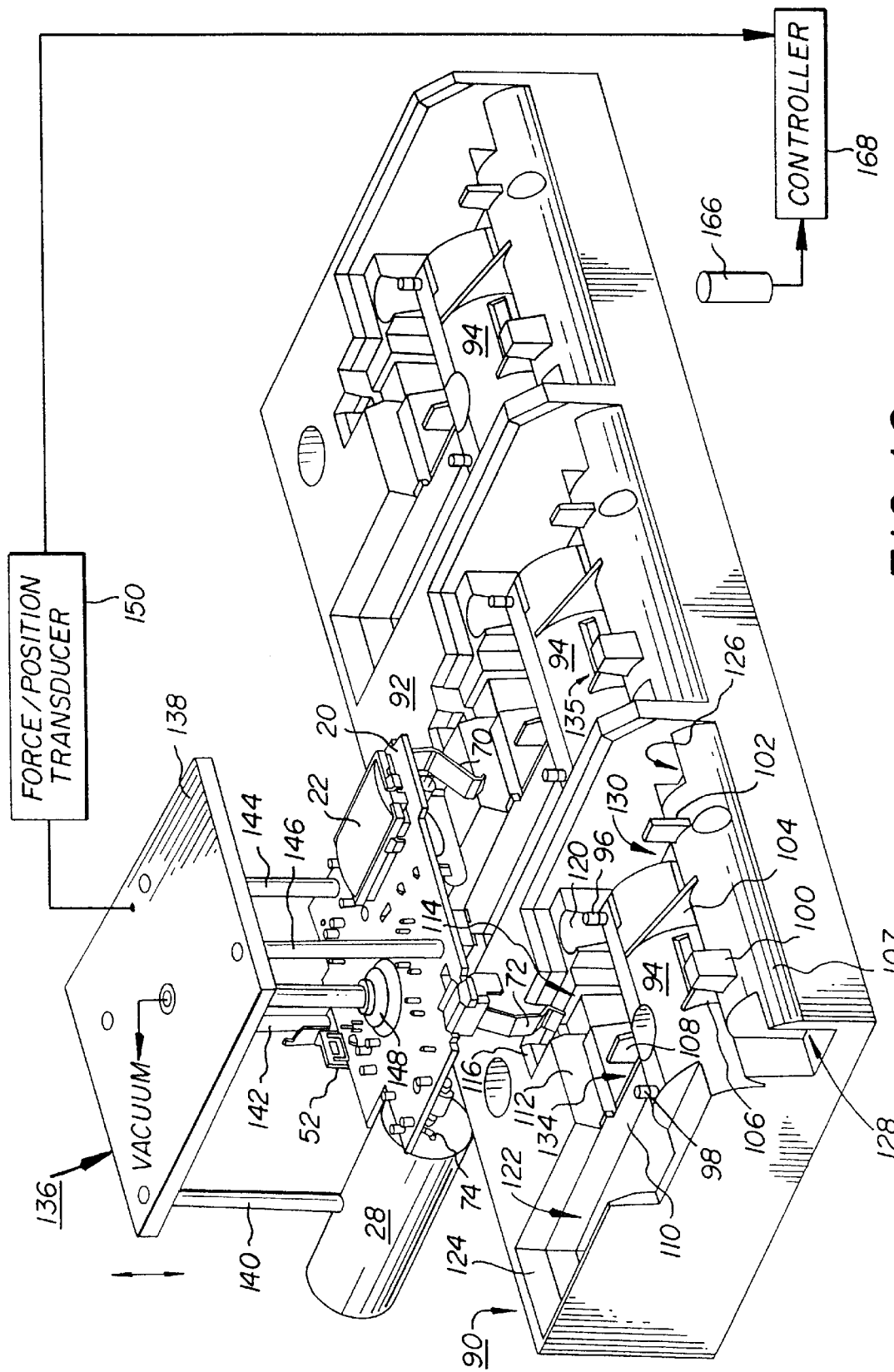
FIG. 10 shows an exploded perspective view of the fixture of FIG. 4, with the printed circuit board of FIG. 3 positioned for insertion into the fixture.

In use of fixture 90, as shown in FIG. 10, a pick-and-place assembly 136, which may be attached to an arm of a conventional robot, not illustrated, is used to place circuit board 20 in the fixture. As shown schematically in FIG. 10, assembly 136 may include a base plate 138 from which depend several probes 140, 142, 144, 146, for engaging, respectively, capacitor 28, flange 80, board 20 next to flash unit 22, and board 20 next to an aperture for latch finger 38. Also supported beneath plate 138 is a suction cup gripper 148 which engages board 20 around switch 24. Assembly 136 may pick each circuit board from an adjacent accumulator or tray, not illustrated, in which the location of each circuit board reasonably accurately known.

Once assembly 136 has acquired a circuit board, the board is positioned closely above fixture 90 and released from suction cup 148. The tapered inlets to the various recesses will guide the circuit board into approximate position on the fixture. Assembly 136 is then lowered to engage probes 140–146 firmly with the circuit board and to press the circuit board into a final seated position on the fixture, as shown in FIG. 11. As indicated previously, movement of the circuit board causes any mispositioned components to engage tapered inlets fixture 90 and be repositioned by a camming action to a desired position. A position or force transducer 150 is provided to monitor the movement of the circuit board. If excessive force is required to reach the final position, this would indicate a serious interference between the circuit board and the fixture. A signal is sent from transducer 150 to a controller 168, to be discussed further in this description.

Assuming that the circuit board has been successfully seated, assembly 136 is withdrawn and, typically, the fixture is moved to a separate testing station, such as shown schematically in FIG. 11. There, a pair of electrical probes 152, 154, connected to the terminals of a direct current power source 156, are engaged with battery clips 70, 72. Flash activation switch is depressed mechanically using a suitable probe, not illustrated; so that, capacitor 28 is charged. When the capacitor is charged adequately to fire flash unit 22, bulb 78 will be illuminated in the familiar manner. As shown schematically in FIG. 10, a sensor 166 is provided beneath each recess 188 of the fixture to detect illumination of the bulb and to signal controller 168. To test the operability of flash unit 22, a pair of probes 158, 160, connected in series with a switch 164, are engaged with a pad 166 on the circuit board and with flange 80 to close a firing circuit on circuit board 20. Closure of switch 164 then causes the flash unit to fire, which can be sensed in any convenient manner, not illustrated.

| Parts List | |
|---|---|
| 10 | internal camera frame |
| 12 | thumbwheel |
| 14 | taking lens and shutter assembly |
| 16 | viewfinder |
| 18 | counterwheel |
| 20 | flash printed circuit board |
| 22 | flash unit |
| 24 | flash activation switch |
| 26 | battery |
| 28 | capacitor |
| 30 | semicylindrical film shell |
| 32, 34 | positioning pins |
| 36 | semicylindrical battery shell |
| 38 | latch finger |
| 39 | U-shaped support wall |
| 40 | support post |
| 42, 44 | stiffener ribs between 30 and 36 |
| 46, 48 | stiffener ribs between 30 and remainder of 10 |
| 50 | catch |
| 52 | flange on 20 |
| 54, 56 | cradle ribs |
| 58, 60 | curved upper surfaces |
| 70, 72 | flexible clips to hold 26 |
| 74, 76 | deformable connectors between 28 and 10 |
| 78 | flash-ready light bulb |
| 80 | lateral flange for shutter spring |
| 82 | transformer |
| 84 | transformer |
| 86 | transistor |
| 88 | capacitor |
| 89 | capacitor |
| 90 | fixture for 20 |
| 92 | base block |
| 94 | semicylindrical portion |
| 96, 98 | positioning pins |
| 100, 102 | support posts |
| 104, 106 | ribs |
| 107 | semicylindrical portion |
| 108, 110 | ribs |
| 112 | upwardly extended surface |
| 114 | recess for 80 |
| 116 | lead-in chamfer or taper on 114 |
| 118 | through bore or recess for 78 |
| 120 | lead-in chamfer or taper on 118 |
| 122 | half-cylindrical recess for 28 |
| 124 | lead-in chamfer or flare on 122 |
| 126, 128 | recesses for 70, 72 |
| 130 | recess for transformer 82 |
| 132 | recess for transistors 86 and capacitor 88 |
| 134 | recess for capacitor 89 |
| 135 | recess for transformer 84 |
| 136 | pick and place assembly |
| 138 | base plate |
| 140, 142, 144, 146 | probes |
| 148 | suction cup |

-continued

| Parts List | |
|---|---|
| 150 | position or force transducer |
| 152, 154 | charging probes |
| 156 | power source |
| 158, 160 | discharging probes |
| 162 | contact pad |
| 164 | switch |
| 166 | sensor for output of 78 |
| 168 | controller |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A fixture for repositioning at least one mispositioned component mounted via at least one deformable connector on and extended outward from a circuit board, said fixture comprising:
    a base;
    means supported by said base for simulating a mounting geometry for the circuit board in an apparatus into which the circuit board is to be installed; and
    camming means supported by said base for engaging the component to deform the connector and thereby reposition the component to a desired position for installation in the apparatus,
    whereby when the circuit board is placed on said means for simulating, the component engages said camming means to deform the connector and reposition the component to the desired position.

2. A fixture according to claim 1, wherein said camming means is stationary on said base.

3. A fixture according to claim 1, wherein said camming means comprises a recess in said base for receiving the component as the circuit board is placed on said means for simulating, said recess having an inlet tapered inwardly to said recess for engaging the component to deform the connector and reposition the component into the desired position within said recess.

4. A fixture according to claim 3 for use with a flash printed circuit board for a photographic camera, the component comprising a flash charging capacitor, wherein said recess is configured to receive the capacitor.

5. A fixture according to claim 3 for use with a flash printed circuit board for a photographic camera, the component comprising a flash ready light bulb, wherein said recess is configured to receive said bulb.

6. A method for repositioning at least one mispositioned component mounted via at least one deformable connector on and extended outward from a circuit board, said method comprising steps of:
    providing a fixture including a base; means supported by said base for simulating a mounting geometry for the circuit board in an apparatus into which the circuit board is to be installed; and camming means supported by said base for engaging the component to deform the connector and thereby reposition the component to a desired position for installation in the apparatus;
    supporting the circuit board on said means for simulating; and
    pressing the component into engagement with said camming means to engage the component to deform the connector and reposition the component to the desired position.

7. A method according to claim 6, further comprising a step of testing the circuit board while the circuit board is supported by said fixture.

8. A method according to claim 6, wherein said camming means is stationary on said base.

9. A method according to claim 6, wherein said camming means comprises a recess in said base for receiving the component as the circuit board is placed on said means for simulating, said recess having an inlet tapered inwardly to said recess; and during said pressing step, the component engages the inlet to deform the connector and reposition the component into the desired position within said recess.

10. A method according to claim 9 for use with a flash printed circuit board for a photographic camera, the component comprising a flash charging capacitor, wherein said recess is configured to receive the capacitor.

11. A method according to claim 9 for use with a flash printed circuit board for a photographic camera, the component comprising a flash ready light bulb, wherein said recess is configured to receive said bulb.

* * * * *